(12) United States Patent
Takeda (10) Patent No.: US 9,683,610 B2
(45) Date of Patent: Jun. 20, 2017

(54) DRIVE FORCE TRANSMISSION DEVICE

(71) Applicant: DENSO CORPORATION, Kariya, Aichi-pref. (JP)

(72) Inventor: Tetsuma Takeda, Obu (JP)

(73) Assignee: DENSO CORPORATION, Kariya (JP)

( * ) Notice: Subject to any disclaimer, the term of this patent is extended or adjusted under 35 U.S.C. 154(b) by 36 days.

(21) Appl. No.: 14/850,064

(22) Filed: Sep. 10, 2015

(65) Prior Publication Data

US 2016/0076597 A1 Mar. 17, 2016

(30) Foreign Application Priority Data

Sep. 12, 2014 (JP) ................... 2014-186723

(51) Int. Cl.
  *F16D 3/68* (2006.01)
(52) U.S. Cl.
  CPC ..................... *F16D 3/68* (2013.01)
(58) Field of Classification Search
  CPC .................. F16D 3/68; F16H 55/14
  USPC ............. 464/73, 75, 93; 123/192.1, 399
  See application file for complete search history.

(56) References Cited

U.S. PATENT DOCUMENTS

| 2,891,395 A * | 6/1959 | Chater | F16D 3/68 464/75 |
| 4,034,575 A * | 7/1977 | Barth | F16D 3/78 464/73 |
| 8,783,225 B2 * | 7/2014 | Hayashi | F02D 9/1065 123/399 X |

FOREIGN PATENT DOCUMENTS

| DE | 27 40 827 A1 | * | 3/1979 |
| FR | 1363829 | * | 5/1964 |
| JP | 2005-98448 |  | 4/2005 |

* cited by examiner

*Primary Examiner* — Gregory Binda
(74) *Attorney, Agent, or Firm* — Nixon & Vanderhye PC (57) ABSTRACT

In a drive force transmission device, a shock-absorbable rubber is placed between a driving-side rotatable body and a driven-side rotatable body. A bridge portion is placed at a deep side of a holding recess of the shock-absorbable rubber and connects between a primary damper portion and a secondary damper portion. At least one cut part penetrates through the bridge portion in an axial direction of the shock-absorbable body and extends in a radial direction of the shock-absorbable body.

6 Claims, 8 Drawing Sheets

DRIVE FORCE TRANSMISSION DEVICE

CROSS REFERENCE TO RELATED APPLICATION

This application is based on and incorporates herein by reference Japanese Patent Application No. 2014-186723 filed on Sep. 12, 2014.

TECHNICAL FIELD

The present disclosure relates to a drive force transmission device that transmits a drive force from a driving-side rotatable body to a driven-side rotatable body.

BACKGROUND

One known type of drive force transmission device, which transmits a drive force (a torque) from a driving-side rotatable body to a driven-side rotatable body through rotation, has a function of a damper for absorbing a torque fluctuation or shock between the driving-side rotatable body and the driven-side rotatable body (see, for example, JP2005-098448A).

This torque transmission device includes a rubbery elastic body (serving as a shock-absorbable body), which is configured into a circular ring form and is made of a rubbery elastic material, and the rubbery elastic body is placed between the driving-side rotatable body and the driven-side rotatable body.

The driving-side rotatable body includes a plurality of driving-side projections, and the driven-side rotatable body includes a plurality of driven-side projections. The driving-side projections and the driven-side projections are alternately arranged one after another about the rotational axis in the circumferential direction.

The rubbery elastic body includes a plurality of primary damper portions, each of which is inserted between a corresponding one of the driving-side projections and a corresponding one of the driven-side projections, and a plurality of secondary damper portions, each of which is inserted between a corresponding one of the driving-side projections and a corresponding one of the driven-side projections. Furthermore, each of a plurality of primary bridge portions connects between a corresponding one of the primary damper portions and a corresponding one of the secondary damper portions. Furthermore, each of a plurality of secondary bridge portions connects between a corresponding one of the primary damper portions and a corresponding one of the secondary damper portions.

The torque transmission device transmits the torque from the driving-side rotatable body to the driven-side rotatable body while each primary damper portion or each secondary damper portion is compressed and deformed between the corresponding driving-side projection of the driving-side rotatable body and the corresponding driven-side projection of the driven-side rotatable body.

Furthermore, the torque transmission device uses the rubbery elastic body. In this rubbery elastic body, each primary engaging groove, into which the corresponding driving-side projection is inserted, is defined by the corresponding primary bridge portion, the corresponding primary damper portion, and the corresponding secondary damper portion, and each secondary engaging groove, into which the corresponding driven-side projection is inserted, is defined by the corresponding secondary bridge portion, the corresponding secondary damper portion, and the corresponding primary damper portion. In the rubbery elastic body, two primary recesses are formed on two circumferentially opposite sides of each primary bridge portion, and two secondary recesses are formed on two circumferentially opposite sides of each secondary bridge portion.

By forming the two primary recesses on the two circumferentially opposite sides of each primary bridge portion and the two secondary recesses on the two circumferentially opposite sides of each secondary bridge portion, formation of a crack in the rubbery elastic body by repeatedly applied stresses (compression stresses), which are applied to the rubbery elastic body, is limited.

However, in the prior art drive force transmission device, the primary and secondary recesses are provided to the primary and secondary bridge portions to alleviate the stress generated in the primary and secondary engaging grooves in the rubbery elastic body when the rubbery elastic body is twisted between the driving-side rotatable body and the driven-side rotatable body in response to the torque transmitted from the driving-side rotatable body to the driven-side rotatable body. However, in a case where the torque, which is transmitted from the driving-side rotatable body to the driven-side rotatable body, is relatively large, a shock absorbing performance of the primary and secondary damper portions may not be sufficient, and thereby a crack may possibly be formed at the primary and secondary engaging grooves of the rubbery elastic body.

Particularly, in the case where the torque, which is transmitted from the driving-side rotatable body to the driven-side rotatable body, is relatively large, or in the case where a shock load is applied to the driving-side rotatable body or the driven-side rotatable body, a tensile stress may be applied to the primary and secondary bridge portions in response to the compression deformation at the primary and secondary damper portions of the rubbery elastic body. At this time, in the prior art drive force transmission device, a sufficient tensile elongation enabling part, which enables tensile elongation of the bridge portion, cannot be provided in the primary and secondary bridge portions due to the above described structure of the primary and secondary bridge portions.

There is a possibility of that a tensile stress is exerted at one of the primary and secondary bridge portions upon application of the compression stress to the one of the primary and secondary bridge portions. In such a case, a crack may be formed from one of the primary and secondary engaging grooves located adjacent to a bottom of one of the primary and secondary recesses at a circumferential side surface adjacent to one of the adjacent primary and secondary damper portions toward a center of the other one the adjacent primary and secondary damper portions to possibly cause severing of the other one of the adjacent primary and secondary damper portions.

Thus, the shock absorbing performance of the primary and secondary damper portions of the rubbery elastic body, or the durability of the rubbery elastic body may be disadvantageously deteriorated.

SUMMARY

The present disclosure addresses the above disadvantages. According to the present disclosure, there is provided a drive force transmission device including a driving-side rotatable body, a driven-side rotatable body, and a shock-absorbable body. The driven-side rotatable body is driven and is rotated by a drive force transmitted from the driving-side rotatable body. The shock-absorbable body is placed between the driving-side rotatable body and the driven-side rotatable body. The shock-absorbable body absorbs a torque fluctuation or a shock exerted between the driving-side rotatable body and the driven-side rotatable body. The driving-side rotatable body and the driven-side rotatable body include a driving-side projection and a driven-side projection, respectively, and the driving-side projection and the driven-side projection are alternately arranged one after another in a circumferential direction of the shock-absorbable body. The shock-absorbable body is in a form of a ring and includes a holding recess, a primary damper portion, a secondary damper portion, a bridge portion, and at least one cut part. One of the driving-side projection and the driven-side projection is inserted into the holding recess. An opening of the holding recess opens in an axial end surface of the shock-absorbable body in an axial direction of the shock-absorbable body and extends from the opening toward a deep side of the holding recess in the axial direction. The primary damper portion and the secondary damper portion are placed on two opposite circumferential sides, respectively, of the holding recess. The bridge portion is placed at the deep side of the holding recess and connects between the primary damper portion and the secondary damper portion. The at least one cut part penetrates through the bridge portion in the axial direction of the shock-absorbable body and extends in a radial direction of the shock-absorbable body.

BRIEF DESCRIPTION OF THE DRAWINGS

The drawings described herein are for illustration purposes only and are not intended to limit the scope of the present disclosure in any way.

DETAILED DESCRIPTION

Various embodiments of the present disclosure will be described with reference to the accompanying drawings.

First Embodiment

FIGS. 1 to 7 show an actuator, which includes a drive force transmission device according to a first embodiment of the present disclosure.

The actuator of the present embodiment is an electric actuator that has functional components received in an inside of a housing fixed to a support portion 2 of an intake manifold 1, which serves as a fixation member at an internal combustion engine (hereinafter referred to as an engine), such as a gasoline engine.

The electric actuator includes an electric motor (hereinafter referred to as a motor) M and a gear train (a worm gear 5, an intermediate gear 6, and a drive force transmission device 100). The motor M generates a drive force that drives a tumble control valve device (a tumble valve 3 and a valve shaft 4) of an air intake system to rotate the same. The gear train transmits the rotation of the motor M to the valve shaft 4.

The drive force transmission device 100 includes a driving-side rotatable body 7, a driven-side rotatable body 8, and a shock-absorbable rubber 9. The drive force transmission device 100 is a torque transmission device that transmits a drive force (a torque) from the driving-side rotatable body 7 to the driven-side rotatable body 8. The drive force transmission device 100 and the valve shaft 4 are rotatably supported through a bearing 10 in an inside of the support portion 2 of the intake manifold 1.

The driving-side rotatable body 7 and the driven-side rotatable body 8 are arranged along a common rotational axis and are rotatable relative to each other in response to torsion (twisting) of the shock-absorbable rubber 9. The driving-side rotatable body 7 includes a plurality of driving-side projections (also referred to as barrier walls or partition walls) 11, and the driven-side rotatable body 8 includes a plurality of driven-side projections (also referred to as barrier walls or partition walls) 12.

The shock-absorbable rubber 9 has a circular hole 20 that axially extends through an inside of the shock-absorbable rubber 9. The shock-absorbable rubber 9 is molded into a form of a ring (more specifically a circular ring) through vulcanization such that the shock-absorbable rubber 9 surrounds the rotational axis of the drive force transmission device 100 (the rotational axis of the driving-side rotatable body 7 and of the driven-side rotatable body 8) in a circumferential direction.

The shock-absorbable rubber 9 includes a plurality (two in this instance) of primary holding recesses 21, into which the driving-side projections 11 are respectively inserted, and a plurality (two in this instance) of secondary holding recesses 22, into which the driven-side projections 12 are respectively inserted. A primary damper portion 23 and a secondary damper portion 24 are placed on two opposite circumferential sides, respectively, of each primary holding recess 21.

The primary damper portion 23 and the secondary damper portion 24, which are placed on the two opposite circumferential sides, respectively, of each primary holding recess 21, are connected with each other through a corresponding one of a plurality of primary bridge portions 25. The primary damper portion 23 and the secondary damper portion 24, which are placed on two opposite circumferential sides, respectively, of each secondary holding recess 22, are connected with each other through a corresponding one of a plurality of secondary bridge portions 26.

The details of the drive force transmission device 100 will be described later.

The intake manifold 1 includes a surge tank and a plurality of intake branch conduits. The surge tank includes a plurality of intake air outlets. The intake branch conduits are connected to the intake air outlets, respectively, of the surge tank.

In each of the intake branch conduits, a partition 33, such as a partition wall, partitions an inside space (an intake branch flow passage of the engine) of the intake branch conduit into a first intake branch flow passage 31 and a second intake branch flow passage 32.

The first intake branch flow passages 31 and the second intake branch flow passages 32 of the intake branch conduits form flow passages that are communicated with a combustion chamber of a corresponding one of cylinders of the engine.

The electric actuator includes the functional components, which are received in the housing fixed to the support portion 2 of the intake manifold 1.

The housing includes an actuator case (hereinafter referred to as a case) 34, a motor gear cover (hereinafter referred to as a cover) 35, a resilient member (elastic member) 36, and a gasket 37. The case 34 is configured into a cup form (a tubular form having a bottom) and receives the motor M, the gear train (including the drive force transmission device 100), and a return spring. An intermediate gear shaft 45 (described later) is fixed to the cover 35 through press fitting. The resilient member 36 resiliently supports the motor M between the case 34 and the cover 35. The gasket 37 is configured into a form of a ring and air-tightly seals a minute gap between the support portion 2 of the intake manifold 1 and the case 34.

The case 34 includes a recess, which is placed between the case 34 and the cover 35 and receives the functional components of the electric actuator. The case 34 has a plurality of installation bosses 38 to fix the case 34 to the housing, particularly the support portion 2 of the intake manifold 1. The case 34 is joined to a connection end surface of the support portion 2 of the intake manifold 1 with a plurality of screws 39, which are installed to the bosses 38, respectively, of the case 34. The case 34 has a case opening 40, which is partially closed with the cover 35.

The more M is received and is held in a receiving chamber of the case 34. The receiving chamber, which receives the motor M, is provided with a damper spring (leaf spring) 41, which is configured into a thin plate form and limits vibrations of the motor M. The motor M includes a motor shaft 42, which extends in a direction of the rotational axis of the motor M, and a motor case (e.g., a motor yoke), which rotatably receives the motor shaft 42.

The motor M, which is a drive source of the electric actuator, is electrically connected to an external electric power source (a battery) installed in a vehicle (e.g., an automobile) through a motor drive circuit, which is electronically controlled by an engine control unit (ECU) that is also referred to as an electronic control device.

The ECU includes a microcomputer, which at least includes a CPU, a ROM and a RAM.

When an ignition switch of the vehicle is turned on (IG ON), the ECU executes an energization control operation of the motor M of the tumble control device based on a control program stored in the memory (e.g., the ROM) of the microcomputer.

At the ECU, sensor signals, which are received from an airflow meter, a crank angle sensor, an accelerator opening degree sensor, a throttle opening degree sensor, an intake air temperature sensor, a coolant temperature sensor and an exhaust gas sensor (an air-fuel ratio sensor, an oxygen concentration sensor), undergo analog-to-digital (A/D) conversion through an A/D converter circuit and are then supplied to the microcomputer.

Next, the details of the gear train will be described with reference to FIGS. 1 to 7.

The gear train includes the worm gear 5, the intermediate gear 6, and the driving-side rotatable body 7. The worm gear 5 is configured into a cylindrical tubular form and is fixed to an outer peripheral surface of the motor shaft 42 of the motor M. The intermediate gear 6 is configured into a cylindrical tubular form and is meshed with the worm gear 5 to rotate integrally with the worm gear 5. The driving-side rotatable body 7 forms an output gear that is meshed with the intermediate gear 6 to rotate integrally with the intermediate gear 6. The gear train is used as a speed reducing gear mechanism that reduces a rotational speed of rotation transmitted from the motor shaft 42 of the motor M. The worm gear 5, the intermediate gear 6 and the driving-side rotatable body 7 are received and held in a receiving chamber of the case 34.

The worm gear 5 includes a cylindrical tubular boss portion that is fixed to an outer peripheral surface of a distal end portion of the motor shaft 42 of the motor M through, for example, press fitting. A worm gear tooth, which is meshed with the intermediate gear 6, spirally extends in an outer peripheral part of the cylindrical tubular boss portion of the worm gear 5.

The intermediate gear 6 includes a helical gear 43 and a pinion gear 44. The helical gear 43 is configured into a cylindrical tubular form and is meshed with the worm gear 5. The pinion gear 44 is configured into a cylindrical tubular form and is directly joined to the helical gear 43. The intermediate gear 6 is rotatably supported by the outer peripheral surface of the intermediate gear shaft 45.

The helical gear 43 includes a cylindrical tubular boss portion that surrounds the intermediate gear shaft 45 in a circumferential direction. Helical gear teeth, which are engageable with the worm gear tooth of the worm gear 5, are arranged one after another in the circumferential direction along the entire outer peripheral surface of the cylindrical boss portion of the helical gear 43.

An outer diameter of the pinion gear 44 is smaller than an outer diameter of the helical gear 43, and the pinion gear 44 is directly joined to an end surface of the helical gear 43. Alternatively, the pinion gear 44 may be formed integrally with the helical gear 43 through a resin molding process. The pinion gear 44 includes a cylindrical tubular boss portion, which surrounds the intermediate gear shaft 45 in the circumferential direction. Pinion gear teeth, which are engageable with output gear teeth (described later) of the driving-side rotatable body 7, are arranged one after another in the circumferential direction along the entire outer peripheral surface of the cylindrical tubular boss portion of the pinion gear 44.

The one end portion of the intermediate gear shaft 45 is securely press fitted into a first engaging recess (not shown), which is formed in a bottom portion of the case 34. The other end portion of the intermediate gear shaft 45, which is opposite from the one end portion of the gear shaft 45, is fitted into a second engaging recess (not shown), which is formed in the cover 35.

The drive force transmission device 100 includes the driving-side rotatable body 7, the driven-side rotatable body 8, and the shock-absorbable rubber 9. The shock-absorbable rubber 9 is twistable between the driving-side rotatable body 7 and the driven-side rotatable body 8 in response to the torque transmitted from the driving-side rotatable body 7 to the driven-side rotatable body 8.

The driving-side rotatable body 7 is integrally formed from synthetic resin or metal. The driven-side rotatable body 8 is integrally formed from synthetic resin or metal. The driving-side rotatable body 7 includes an opposing portion 51. The driven-side rotatable body 8 includes an opposing portion 52. The opposing portion 51 of the driving-side rotatable body 7 and the opposing portion 52 of the driven-side rotatable body 8 are opposed to each other in the axial direction while a cushion receiving chamber, which receives the shock-absorbable rubber 9, is interposed between the opposing portion 51 and the opposing portion 52. An opposing surface of the opposing portion 51 and an opposing surface of the opposing portion 52 are opposed to each other and are spaced from each other by a predetermined distance (a predetermined axial distance).

The driving-side rotatable body 7 includes the driving-side projections 11, which are formed in the opposing surface of the opposing portion 51, a gear tooth forming portion 53, which is configured into a cylindrical tubular form and is engageable with the pinion gear 44, and a projecting shaft portion 54, which is configured into a cylindrical tubular form and is placed on a radially inner side of the gear tooth forming portion 53.

The cushion receiving chamber, which is configured into a cylindrical tubular form, is formed in an inside (a radially inner side) of the gear tooth forming portion 53. Furthermore, a plurality of output gear teeth 55 is arranged one after another in the circumferential direction along the entire outer peripheral surface of the output gear tooth forming portion 53 to engage with the pinion gear teeth of the pinion gear 44.

The projecting shaft portion 54, which projects from the opposing surface of the opposing portion 51 toward the opposing portion 52 side, is integrally formed at a center part of the opposing surface of the opposing portion 51.

The projecting shaft portion 54 is configured into a cylindrical tubular form such that the projecting shaft portion 54 surrounds the projecting shaft portion 56 of the driven-side rotatable body 8 in the circumferential direction. A through hole 57, which is a circular hole and communicates between two axial end surfaces of the projecting shaft portion 54, is formed in the inside of the opposing portion 51 and the inside of the projecting shaft portion 54.

Each of the driving-side projections 11 radially projects from an inner peripheral surface of the gear tooth forming portion 53 to an outer peripheral surface of the projecting shaft portion 54. That is, each of the driving-side projections 11 projects from the radially outer side to the radially inner side in the radial direction. The driving-side projections 11 axially project from the opposing surface of the opposing portion 51 toward the opposing portion 52.

The driving-side projections 11 are arranged one after another at predetermined intervals (equal intervals, such as 180 degree intervals) in the circumferential direction of the driving-side rotatable body 7. Each of the driving-side projections 11 is inserted between corresponding adjacent two of the driven-side projections 12.

Figure 1:
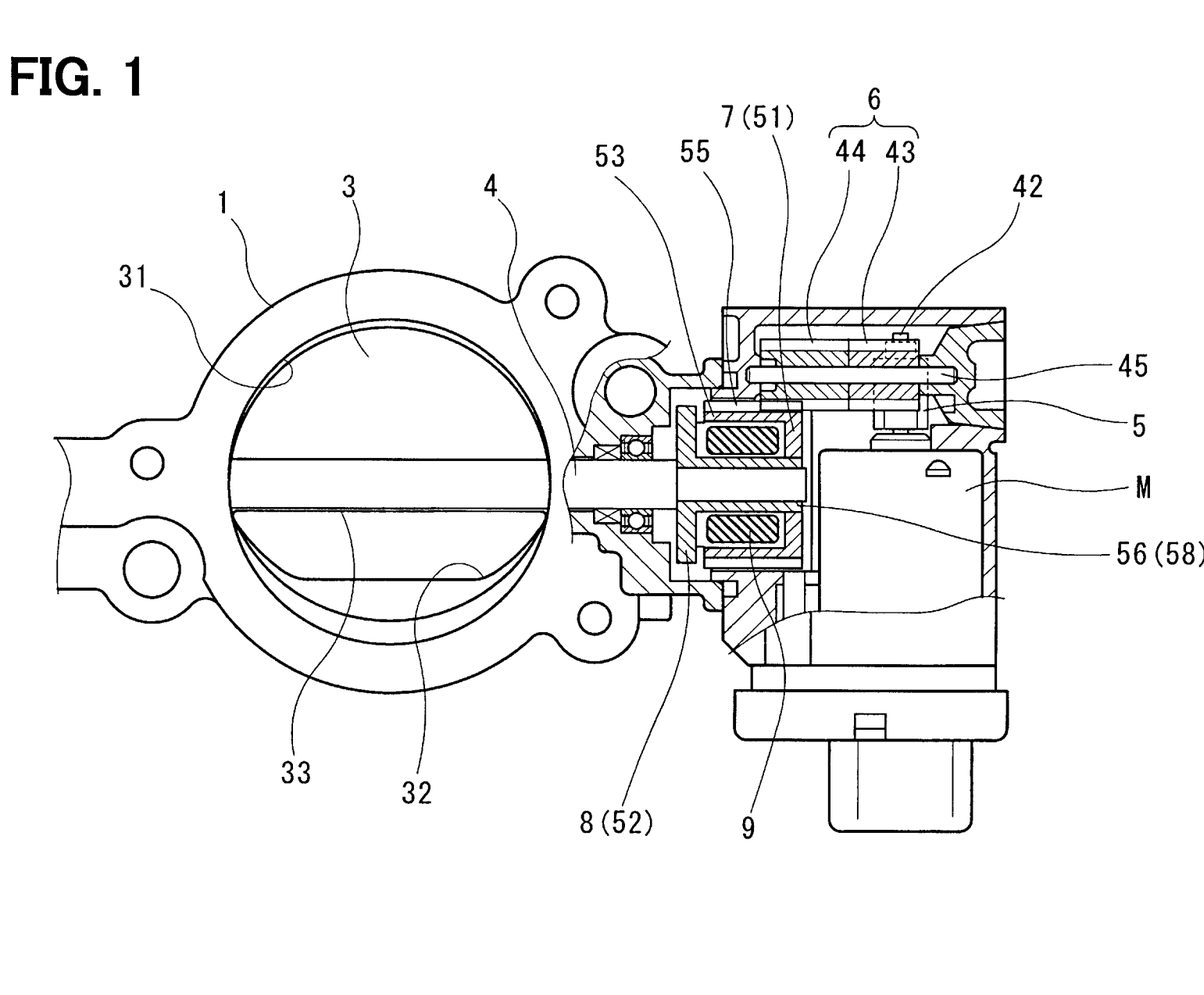
FIG. 1 is a partial cross-sectional view of an electric actuator that drives a tumble control valve device of an air intake system according to a first embodiment of the present disclosure.
Figure 2:
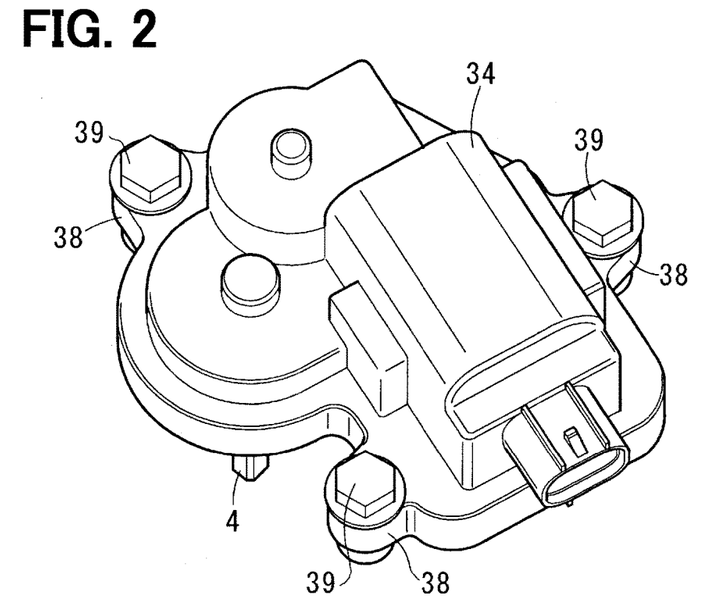
FIG. 2 is a perspective view of the electric actuator according to the first embodiment.
Figure 3:
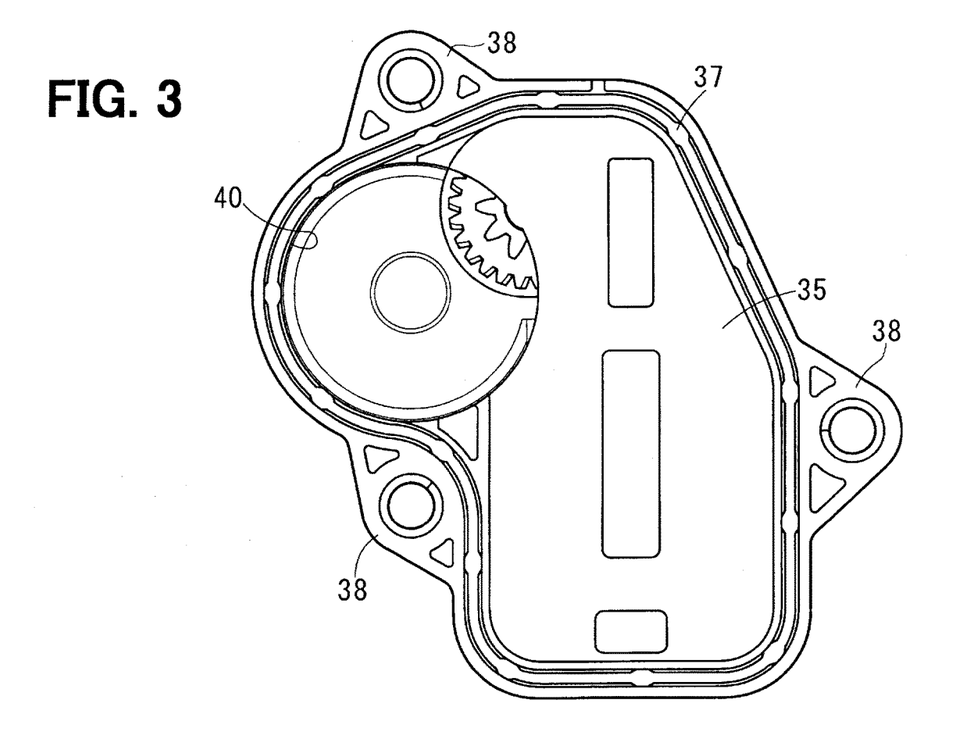
FIG. 3 is a plan view of the electric actuator according to the first embodiment.
Figure 4:
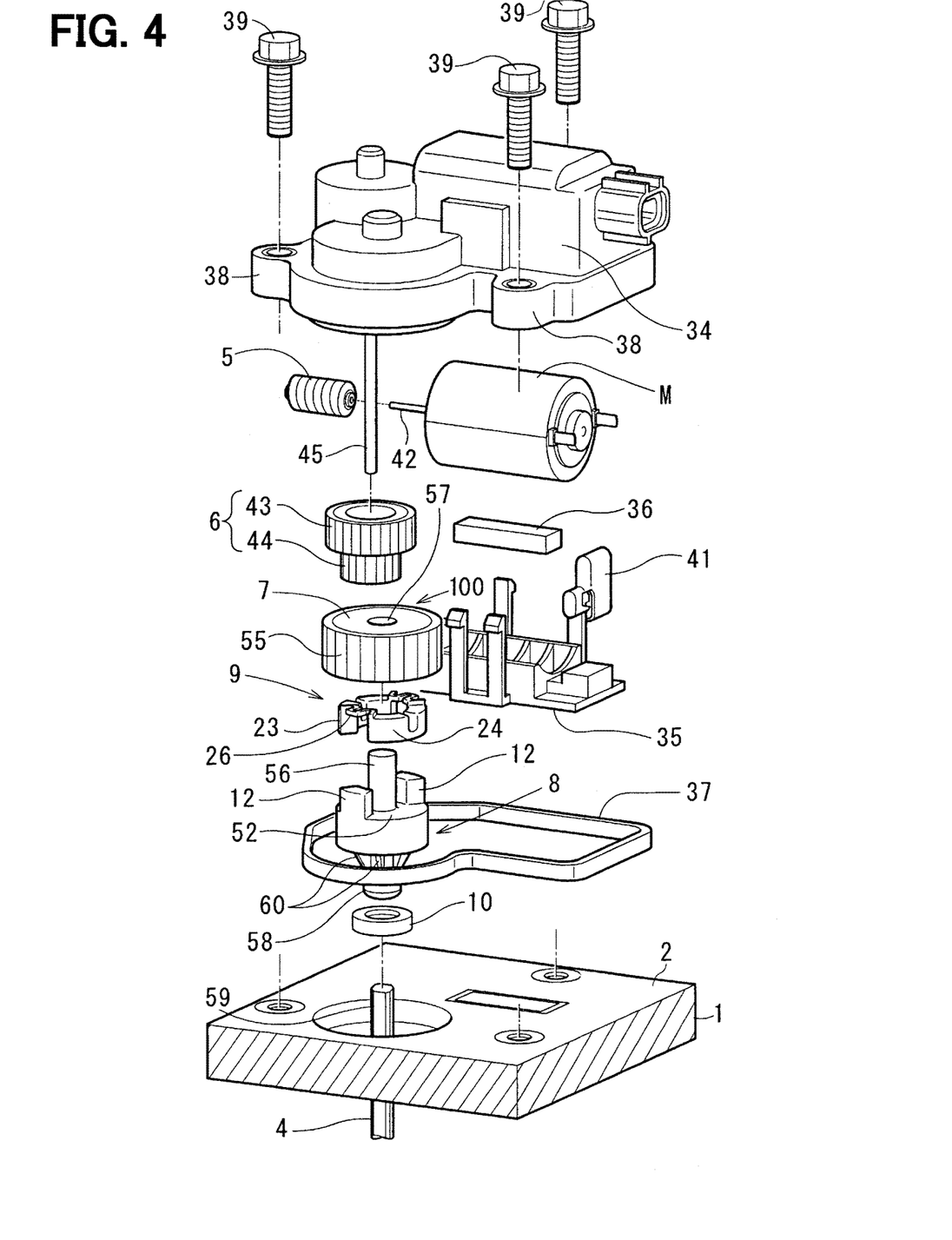
FIG. 4 is an exploded perspective view of the electric actuator according to the first embodiment.

The driven-side rotatable body 8 includes the driven-side projections 12, which are formed in the opposing surface of the opposing portion 52, and the projecting shaft portion 56, which is configured into a hollow tubular form and axially projects from the center part of the opposing portion 52 toward the upper side in FIG. 4.

The driven-side rotatable body 8 includes a projecting shaft portion 58, which is configured into a hollow tubular form and projects from a center part of the opposing portion 52 toward a lower side in FIG. 4.

A fitting hole (not shown), which is configured as a polygonal hole (a rectangular hole), is formed in the inside of the projecting shaft portion 58, and the fitting shaft portion 59 of the valve shaft 4 is press fitted into the fitting hole of the projecting shaft portion 58.

A plurality of ridge ribs 60 may be formed in an outer peripheral surface of the projecting shaft portion 58.

The driven-side projections 12 are partitions that axially project from the opposing surface of the opposing portion 52 toward the opposing portion 51. The driven-side projections 12 are intermittently formed in the circumferential direction in the opposing portion 52.

As shown in FIG. 4, each of the driven-side projections 12 may be radially outwardly projected from a position, which is radially outwardly spaced from the projecting shaft portion 56 by a predetermined distance, toward the radially outer side.

The driven-side projections 12 are arranged one after another at predetermined intervals (equal intervals, such as 180 degree intervals) in the circumferential direction of the driven-side rotatable body 8. Each of the driven-side projections 12 is inserted between corresponding adjacent two of the driving-side projections 11.

In this way, a portion (primary space portion) of the cushion receiving chamber is formed between each driving-side projection 11 and a circumferentially adjacent one of the driven-side projections 12, which is circumferentially adjacent to the driving-side projection 11. Thereby, a portion (secondary space portion) of the cushion receiving chamber is formed between each driven-side projection 12 and a circumferentially adjacent one of the driving-side projections 11.

The shock-absorbable rubber 9 serves as a shock-absorbable body of the present disclosure. The shock-absorbable rubber 9 is configured into the form of the circular ring and absorbs a shock (load) torque or a torque fluctuation exerted to the driving-side rotatable body 7 or the driven-side rotatable body 8.

The shock-absorbable rubber 9 is integrally formed from a rubbery elastic material. The shock-absorbable rubber 9 is configured into the circular ring form having a predetermined wall thickness in the axial direction and surrounds the projecting shaft portions 54, 56 in the circumferential direction.

The rubbery elastic material (elastomer), which forms the shock-absorbable rubber 9, is not limited to any particular one as long as the shock-absorbable rubber 9 has elasticity in a predetermined elastic region. For example, the rubbery elastic material may be synthetic rubber (e.g., Hydrogenated nitrile butadiene rubber (H-NBR), silicone rubber, or fluoro rubber (FPM)) or thermoplastic elastomer, which is a mixture of polypropylene (PP) and ethylene propylene rubber (EPDM).

Alternatively, the rubbery elastic material may be a blend material, in which a plurality of types of synthetic rubbers and/or natural rubbers are blended. An outer shape or a cross-sectional shape of the shock-absorbable rubber 9 may be freely set according to a shape (spatial shape) of the cushion receiving chamber, which is formed between the opposing portion 51 of the driving-side rotatable body 7 and the opposing portion 52 of the driven-side rotatable body 8.

The shock-absorbable rubber 9 includes the primary holding recesses 21 and the secondary holding recesses 22. An opening (hereinafter referred to as a primary opening) 21a of each primary holding recess 21 opens in one axial end surface 9a of the shock-absorbable rubber 9 (i.e., one axial end of the shock-absorbable rubber 9) in the axial direction of the shock-absorbable rubber 9, and the primary holding recess 21 extends from the primary opening 21a toward a deep side of the primary holding recess 21 in the axial direction. An opening (hereinafter referred to as a secondary opening) 22a of each secondary holding recess 22 opens in the other axial end surface 9b of the shock-absorbable rubber 9 (i.e., the other axial end of the shock-absorbable rubber 9) in the axial direction of the shock-absorbable rubber 9, and the secondary holding recess 22 extends from the secondary opening 22a toward a deep side of the secondary holding recess 22 in the axial direction. Furthermore, the shock-absorbable rubber 9 includes a plurality of primary damper portions (more specifically, two primary damper portions in this instance) 23 and a plurality of secondary damper portions (more specifically, two secondary damper portions in this instance) 24. Each primary damper portion 23 is twisted between the corresponding one of the driving-side projections 11 of the driving-side rotatable body 7, which is located on one circumferential side of the primary damper portion 23, and the corresponding one of the driven-side projections 12 of the driven-side rotatable body 8, which is located on the other circumferential side of the primary damper portion 23, in response to the drive force (torque) transmitted from the driving-side rotatable body 7 to the driven-side rotatable body 8. The shock-absorbable rubber 9 includes a plurality of primary bridge portions (more specifically, two primary bridge portions in this instance) 25 and a plurality of secondary bridge portions (more specifically, two secondary bridge portions in this instance) 26. Each primary bridge portion 25 connects between the corresponding one of the primary damper portions 23 and the corresponding one of the secondary damper portions 24 across the corresponding one of the primary holding recesses 21. Each secondary bridge portion 26 connects between the corresponding one of the primary damper portions 23 and the corresponding one of the secondary damper portions 24 across the corresponding one of the secondary holding recesses 22.

Each primary holding recess 21 is a primary engaging groove, which has a bottom and receives the corresponding driving-side projection 11 that projects from the opposing surface of the opposing portion 51 of the driving-side rotatable body 7. Each primary holding recess 21 is a space that is defined by the corresponding primary damper portion 23, the corresponding secondary damper portion 24, and the corresponding primary bridge portion 25. The primary holding recess 21 has the primary opening 21a at the one axial end of the shock-absorbable rubber 9, and the corresponding driving-side projection 11 is fitted into the primary holding recess 21 through the primary opening 21a.

Each secondary holding recess 22 is a secondary engaging groove, which has a bottom and receives the corresponding driven-side projection 12 that projects from the opposing surface of the opposing portion 52 of the driven-side rotatable body 8. Each secondary holding recess 22 is a space that is defined by the corresponding secondary damper portion 24, the corresponding primary damper portion 23, and the corresponding secondary bridge portion 26. The secondary holding recess 22 has the secondary opening 22a at the other axial end of the shock-absorbable rubber 9, and the corresponding driven-side projection 12 is fitted into the secondary holding recess 22 through the secondary opening 22a.

The primary damper portions 23 are primary rubbery elastic bodies (thick wall portions), each of which is elastically deformable (compressively deformable) in a twisting direction about the rotational axis of the drive force transmission device 100. Each primary damper portion 23 is held in a corresponding one of primary space sections of the cushion receiving chamber defined between the opposing portion 51 of the driving-side rotatable body 7 and the opposing portion 52 of the driven-side rotatable body 8.

One circumferential end part (a root at the primary damper portion 23 side) of each secondary bridge portion 26, which has cut parts described later, is joined to a corresponding circumferential end surface of the corresponding primary damper portion 23, i.e., a corresponding primary wall surface 61 of the corresponding primary damper portion 23, which is planar and extends in the radial direction of the shock-absorbable rubber 9 in the corresponding primary damper portion 23.

Figure 5:
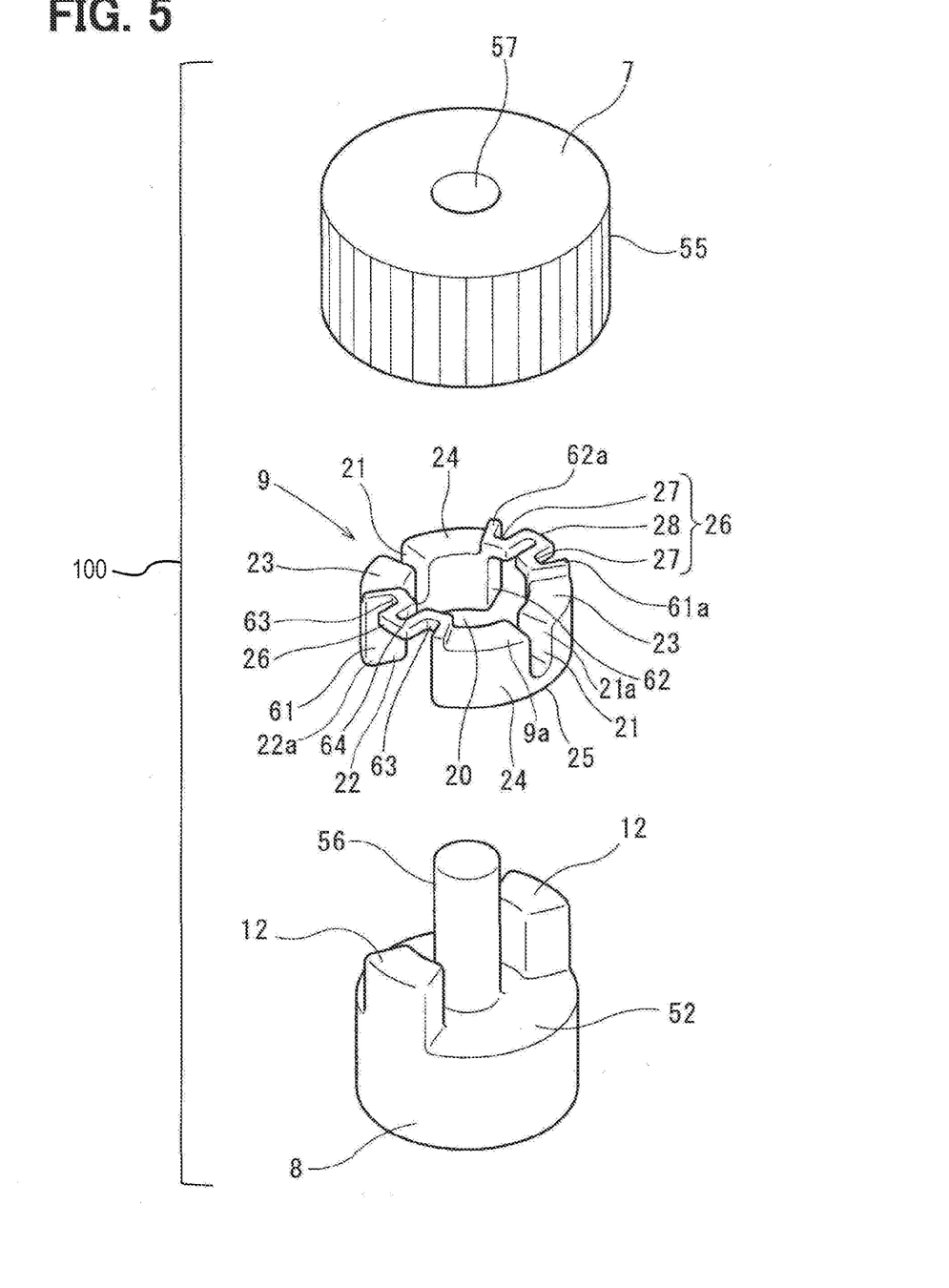
FIG. 5 is an exploded perspective view of a drive force transmission device of the first embodiment.
Figure 6A:
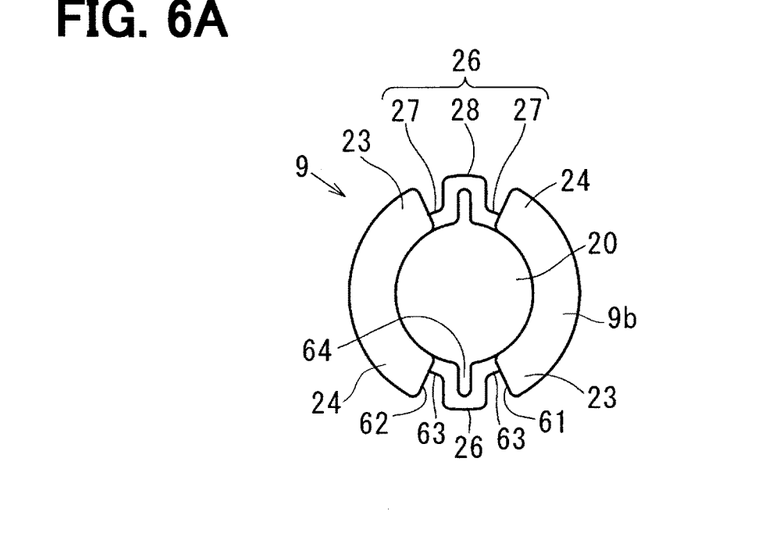
FIG. 6A is a top view of a shock-absorbable rubber of the first embodiment.
Figure 6B:
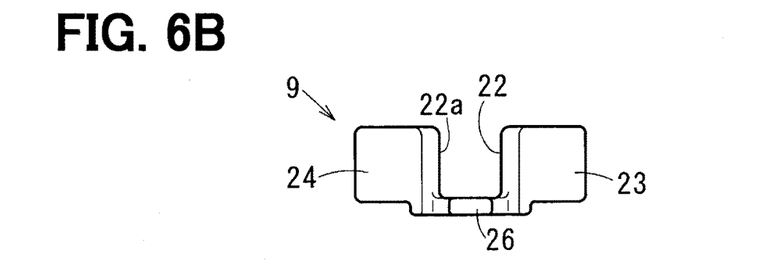
FIG. 6B is a side view of the shock-absorbable rubber of FIG. 6A.
Figure 6C:
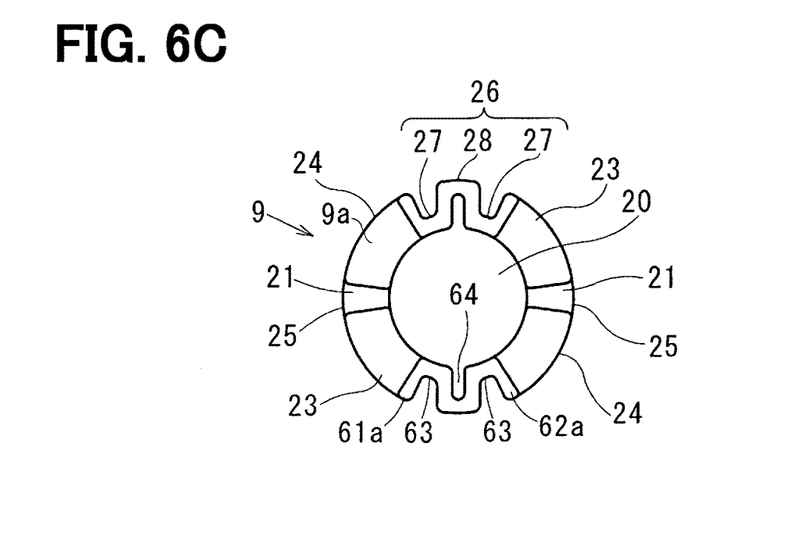
FIG. 6C is a bottom view of the shock-absorbable rubber of FIGS. 6A and 6B.
Figure 7:
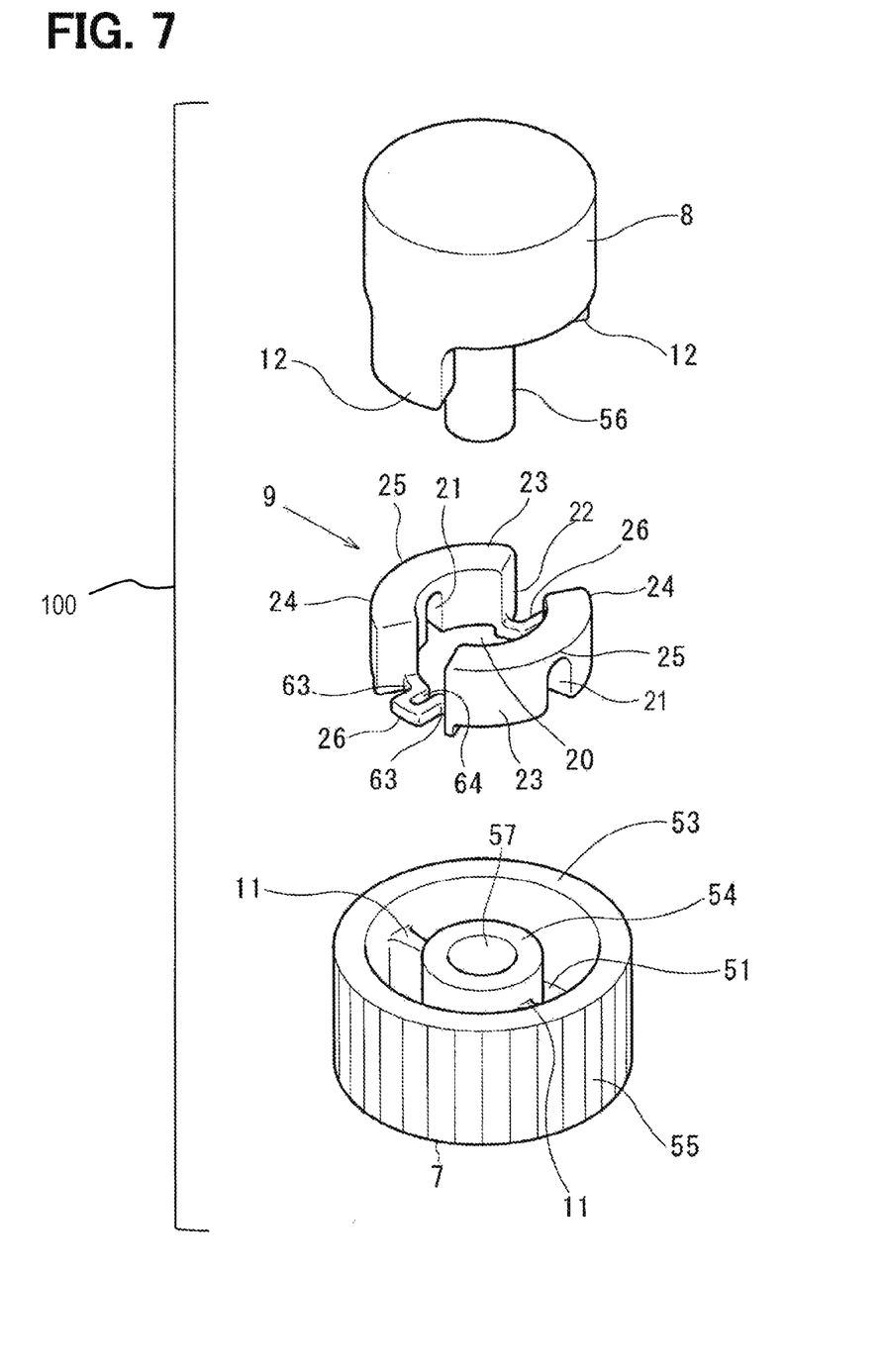
FIG. 7 is an exploded perspective view of the drive force transmission device of the first embodiment.

A primary projection (thick wall part) 61a is formed in one axial end surface of the primary damper portion 23 (an axial end surface of the primary damper portion 23 located on the side where the opposing surface of the opposing portion 51 of the driving-side rotatable body 7 is placed) such that the primary projection 61a projects toward the upper side in FIGS. 4 and 5 by an amount, which corresponds to an axial wall thickness of the secondary bridge portion 25, at a location adjacent to the primary wall surface 61, and the primary projection 61a extends along the primary wall surface 61 in the radial direction of the shock-absorbable rubber 9. The one circumferential end part (the root) of the secondary bridge portion 26 is joined to the primary wall surface 61 at the primary projection 61a.

The secondary damper portions 24 are secondary rubbery elastic bodies (thick wall portions), each of which is elastically deformable (compressively deformable) in a twisting direction about the rotational axis of the drive force transmission device 100. Each secondary damper portion 24 is held in a corresponding one of secondary space sections of the cushion receiving chamber defined between the opposing portion 51 of the driving-side rotatable body 7 and the opposing portion 52 of the driven-side rotatable body 8.

The other circumferential end part (a root at the secondary damper portion 24 side) of each secondary bridge portion 26, which has the cut parts described later, is joined to a corresponding circumferential end surface of the corresponding secondary damper portion 24, i.e., a corresponding secondary wall surface 62 of the corresponding secondary damper portion 24, which is planar and extends in the radial direction of the shock-absorbable rubber 9 in the corresponding secondary damper portion 24.

A secondary projection (thick wall part) 62a is formed in one axial end surface of the secondary damper portion 24 (an axial end surface of the secondary damper portion 24 located on the side where the opposing surface of the opposing portion 51 of the driving-side rotatable body 7 is placed) such that the secondary projection 62a projects toward the upper side in FIGS. 4 and 5 by the amount, which corresponds to the axial wall thickness of the secondary bridge portion 26, at a location adjacent to the secondary wall surface 62, and the secondary projection 62a extends along the secondary wall surface 62 in the radial direction of the shock-absorbable rubber 9. The other circumferential end part (the root) of the secondary bridge portion 26 is joined to the secondary wall surface 62 at the secondary projection 62a.

Each primary bridge portion 25 is placed at the deep side of the corresponding primary holding recess 21, i.e., is placed at the other axial end surface 9b side of the shock-absorbable rubber 9. Each primary bridge portion 25 connects between a corresponding circumferential end surface of the corresponding primary damper portion 23 and a corresponding circumferential end surface of the secondary damper portion 24 in the circumferential direction of the shock-absorbable rubber 9.

Each primary bridge portion 25 is a primary connecting portion (thin wall portion) that has an axial wall thickness smaller than an axial wall thickness of the primary and secondary damper portions 23, 24, which are thick. Furthermore, similar to the primary and secondary damper portions 23, 24, each primary bridge portion 25 is resiliently deformable in the circumferential direction of the drive force transmission device 100.

Each secondary bridge portion 26 is placed at the deep side of the corresponding secondary holding recess 22, i.e., is placed at the one axial end surface 9a side of the shock-absorbable rubber 9. Each secondary bridge portion 26 connects between the corresponding circumferential end surface of the corresponding secondary damper portion 24 and the corresponding circumferential end surface of the primary damper portion 23 in the circumferential direction of the shock-absorbable rubber 9.

Each secondary bridge portion 26 is a secondary connecting portion (thin wall portion) that has an axial wall thickness smaller than the axial wall thickness of the primary and secondary damper portions 23, 24, which are thick. Furthermore, similar to the primary and secondary damper portions 23, 24, each secondary bridge portion 26 is resiliently deformable in the circumferential direction of the drive force transmission device 100.

Furthermore, a connection between the secondary bridge portion 26 and the primary damper portion 23 and a connection between the secondary bridge portion 26 and the secondary damper portion 24 are placed at a radially inner side of the secondary bridge portion 26, i.e., at a radially inner side of the shock-absorbable rubber 9.

Each secondary bridge portion 26 includes three cut parts 63, 64 (more specifically, two radially outer cut parts 63 and one radially inner cut part 64), which extend in the radial direction of the shock-absorbable rubber 9. The cut parts 63, 64 penetrate through the secondary bridge portion 26 in the axial direction of the shock-absorbing rubber 9. In each secondary bridge portion 26, one of the cut parts 63 is formed by cutting into the one circumferential end part of the secondary bridge portion 26 in the radial direction of the shock-absorbable rubber 9 along an extension of the corresponding primary wall surface 61 of the corresponding primary damper portion 23, and another one of the cut parts 63 is formed by cutting into the other circumferential end part of the secondary bridge portion 26 in the radial direction of the shock-absorbable rubber 9 along an extension of the corresponding secondary wall surface 62 of the secondary damper portion 24.

Each cut part 63 is a primary cut part, which is a groove having a radial bottom (a radially inner bottom) and is formed by cutting into the secondary bridge portion 26 from the radially outer side toward the radially inner side.

Each cut part 64 is a secondary cut part, which is a groove having a radial bottom (a radially outer bottom) and is formed by cutting into the secondary bridge portion 26 (more specifically, a circumferential center part of the secondary bridge portion 26) from the radially inner side toward the radially outer side.

Each secondary bridge portion 26 includes the three cut parts 63, 64, and a width of the secondary bridge portion 26, which is measured in the radial direction of the shock-absorbable rubber 9, is generally constant. Furthermore, in each secondary bridge portion 26, tensile elongation enabling parts 27, 28, which enable tensile elongation (spreading) of the secondary bridge portion 26, are provided on two circumferential sides of the cut part 63, 64.

The axial wall thickness (plate thickness) of each primary bridge portion 25 may be equal to the axial wall thickness (plate thickness) of each secondary bridge portion 26 or may be not equal to the axial wall thickness (plate thickness) of each secondary bridge portion 26.

A molding die arrangement, which is used to mold the shock-absorbable rubber 9 through vulcanization, includes an upper die (a movable die) and a lower die (a stationary die), which form a cavity that has a shape corresponding to a product shape of the shock-absorbable rubber 9. A pressurizing chamber (also referred to as a transfer pot), which is communicated with the cavity, is formed in one of the upper die and the lower die (e.g., an upper die having a rubber reservoir), and an unvulcanized rubber material (uncured rubber material) is supplied into the pressurizing chamber. Thereafter, the unvulcanized rubber material in the pressurizing chamber is pressurized with a pressurizing die and is thereby injected from the pressurizing chamber into the cavity through an injection hole.

Then, the unvulcanized rubber material, which is injected into the cavity, is heated in the molding die arrangement after a die closing process of the molding die arrangement (while maintaining the pressurized state), so that the shock-absorbable rubber 9, which is molded into the product shape through the vulcanization, is formed.

Besides the above-described transfer molding process, there are other possible molding processes for molding the shock-absorbable rubber 9, particularly molding processes using a molding die arrangement. These molding processes may include, for example, a compression molding process and an injection molding process. The shock-absorbable rubber 9 may be molded into the product shape through vulcanization by one of such molding processes.

Next, the operation of the electric actuator, which opens and closes the tumble control valve device of the present embodiment, will be briefly described with reference to FIGS. 1 to 7.

The ECU determines whether the operation of the engine is in a tumble execution range, in which a tumble flow in the combustion chamber of each cylinder of the engine needs to be enhanced, or in a tumble non-execution range, in which the tumble flow in the combustion chamber does not need to be enhanced, based on the operational state of the engine, such as an engine rotational speed and an engine load (an accelerator opening degree or a throttle opening degree).

A required tumble ratio may be obtained based on the operational state of the engine, such as the engine rotational speed and the engine load. Then, when the required tumble ratio is equal to or larger than a predetermined value, the tumble control valve device may be fully closed. In contrast, when the required tumble ratio is smaller than the predetermined value, the tumble control valve device may be fully opened.

When the ECU determines that the operation of the engine is in the tumble execution range, the tumble control valve device is fully closed by transmitting the drive force of the motor M to the valve shaft 4 through the energization control operation of the motor M.

When the tumble control valve device is fully closed, the first intake branch flow passage of each intake branch conduit is closed. At this time, the intake air to be supplied to the combustion chamber of each cylinder of the engine passes only through each second intake branch flow passage 32, which is opened. Therefore, a flow of the intake air is biased to an upper portion of an intake port of each cylinder of the engine, and thereby a tumble flow in a vertical direction (longitudinal direction) is generated in the combustion chamber of each cylinder of the engine. Thus, a combustion efficiency in the combustion chamber at the time of starting the engine or at the time of operating the engine in an idling state is improved, and thereby a fuel consumption and/or exhaust emissions (e.g., an HC reducing effect) can be improved.

In contrast, when the ECU determines that the operation of the engine is in the tumble non-execution range, the energization of the motor M is stopped, and thereby the tumble control valve device is fully opened by an urging force of the return spring.

At the time of fully opening the tumble control valve device, each first intake branch flow passage 31 is opened. Thereby, the first intake branch flow passages 31 and the second intake branch flow passages 32 of the intake branch conduits are fully opened.

At this time, it should be noted that each tumble valve 3 of the tumble control valve device may be set to have an intermediate opening degree where the tumble valve 3 is held in an intermediate operational position and is thereby half opened.

In a case where the transmission of the torque causes generation of a shock, the primary damper portions 23 and the secondary damper portions 24 of the shock-absorbable rubber 9 are compressed and deformed in a twisting direction of the shock-absorbable rubber 9 at the moment of that the projection (e.g., one of the ridge ribs 60) of the driven-side rotatable body 8, which is integrally rotatably connected to the tumble valve 3 and the valve shaft 4, abuts against a full closing position stopper. In this way, a shock load, which is transmitted to the worm gear 5 fixed to the motor shaft 42 of the motor M, can be alleviated. Thereby, it is possible to limit occurrence of locking (worm lock) of the worm gear 5.

Furthermore, during the middle of the operation of the motor M, the drive force (the torque) of the motor M compresses the primary and secondary damper portions 23, 24 of the shock-absorbable rubber 9 to flex the same. Therefore, a backlash between the worm gear 5 and the helical gear 43 and a backlash between the pinion gear 44 and the driving-side rotatable body 7 can be minimized with a reaction force (elastic restoring force) of the flexed primary and secondary damper portions 23, 24. In this way, in addition to a self-locking effect of the worm gear 5, which is implemented at the stop time of the motor M, rattling of the tumble valve 3 can be limited regardless of whether the motor M is operated or not.

Now, advantages of the first embodiment will be described.

As discussed above, the electric actuator of the present embodiment includes the drive force transmission device 100, which transmits the torque of the motor M to the valve shaft 4 of the tumble control valve device.

In this drive force transmission device 100, the cut parts 63, 64 penetrate through the corresponding bridge portion 26 of the shock-absorbable rubber 9, which absorbs the torque fluctuation or the shock between the driving-side rotatable body 7 and the driven-side rotatable body 8, in the axial direction of the shock-absorbable rubber 9, and the cut parts 63, 64 extend in the corresponding bridge portion 26 in the radial direction of the shock-absorbable rubber 9. Thereby, even in the case where the torque, which is transmitted from the driving-side rotatable body 7 to the driven-side rotatable body 8, is relatively large, a shortage in the shock absorbing performance of the primary and secondary damper portions 23, 24 of the shock-absorbable rubber 9 does not occur. Thereby, it is possible to limit generation of cracks in, for example, the secondary holding recesses 22 of the shock-absorbable rubber 9.

Particularly, when the primary and secondary damper portions 23, 24 of the shock-absorbable rubber 9 are twisted between the driving-side rotatable body 7 and the driven-side rotatable body 8 in response to the torque transmitted from the driving-side rotatable body 7 to the driven-side rotatable body 8, each secondary bridge portion 26 is spread (extended, unfolded) in the circumferential direction because of the cut parts 63, 64, which are formed in the bridge portion 26 of the shock-absorbable rubber 9. Thereby, the relatively large tensile elongation enabling parts (also referred to as spreadable arm segments or unfoldable arm segments) 27, 28 can be provided in each secondary bridge portion 26 of the shock-absorbable rubber 9. That is, the stress absorbing performance of the secondary bridge portion 26 for absorbing the tensile stress applied to the secondary bridge portion 26 is improved, so that the substantial stress is not generated in the secondary holding recess 22 of the shock-absorbable rubber 9. In this way, it is possible to limit generation of the defect, such as generation of the crack from the axial end surface of the primary damper portion 23 or the secondary damper portion 24 of the shock-absorbable rubber 9 toward the center of the primary damper portion 23 or the secondary damper portion 24. As a result, the primary and secondary damper portions 23, 24 will not be severed.

As discussed above, it is possible to limit the generation of the defect, such as the generation of the crack in the primary and secondary damper portions 23, 24 of the shock-absorbable rubber 9. As a result, the shock absorbing performance of the primary and secondary damper portions 23, 24 of the shock-absorbable rubber 9 and the durability of the shock-absorbable rubber 9 can be improved.

The circumferential end parts (the roots) of each secondary bridge portion 26 are joined to the primary and secondary wall surfaces 61, 62, respectively, of the primary and secondary damper portions 23, 24 of the shock-absorbable rubber 9. Each of the cut parts 63 is formed by cutting into the secondary bridge portion 26 in the radial direction of the shock-absorbable rubber 9 along the extension of the corresponding one of the primary and secondary wall surfaces 61, 62 from the radially outer side toward the radially inner side. Also, each cut part 64 is formed by cutting into the secondary bridge portion 26, more specifically, the circumferential center part of the secondary bridge portion 26 from the radially inner side toward the radially outer side. In this way, it is possible to limit the occurrence of the defect, such as the generation of the crack in the primary and secondary damper portions 23, 24.

Furthermore, when the cut parts 63, 64 are formed in each of the secondary bridge portions 26 of the shock-absorbable rubber 9, both of the compression stress and the tensile stress exerted in the shock-absorbable rubber 9 can be counteracted. Therefore, it is not necessary to form the cut parts in the primary bridge portions 25 of the shock-absorbable rubber 9.

In the case of the rubbery elastic body of the prior art torque transmission device, each of the circumferential end parts (the roots) of each of the primary and secondary bridge portions is joined to the entire radial extent of one axial end part or the other axial end part of the circumferential end surface of the corresponding one of the primary and secondary damper portions. Therefore, the stress is applied to the entire radial extent of the one axial end part or the other axial end part of the circumferential end surface of the corresponding one of the primary and secondary damper portions. In contrast to the structure of the prior art rubbery elastic body, in the shock-absorbable rubber 9, the connection between each secondary bridge portion 26 and the corresponding primary damper portion 23 and the connection between the secondary bridge portion 26 and the corresponding secondary damper portion 24 are placed only at the radially inner side of the shock-absorbable rubber 9. That is, since each secondary bridge portion is connected to the corresponding primary damper portion 23 and the corresponding secondary damper portion 24 only at the radially inner side of the shock-absorbable rubber 9, the stress is applied only to the radially inner side of the primary wall surface 61 of the corresponding primary damper portion 23 and the radially inner side of the secondary wall surface 62 of the corresponding secondary damper portion 24. Thereby, in comparison to the shock-absorbable rubber, in which the secondary bridge portion is connected to the corresponding primary damper portion and the corresponding secondary damper portion at the radially outer side of the shock-absorbable rubber, the stress, which is generated at the connections of the secondary bridge portion 26 to the corresponding primary damper portion 23 and the corresponding secondary damper portion 24, is reduced according to the present embodiment.

Here, it should be noted that even if a crack is generated at the stress generating portion of the secondary bridge portion 26, or even if the secondary bridge portion 26 is severed, a crack will not be formed in the corresponding primary damper portion 23 and the corresponding secondary damper portion 24. Therefore, the shock can be absorbed with the primary and secondary damper portions 23, 24. As a result, there is no disadvantage with respect to the shock absorbing function of the shock-absorbable rubber 9.

Second Embodiment

FIGS. 8A to 8D indicate various types (first to fourth examples) of shock-absorbable rubbers, each of which can be used as the shock-absorbable rubber 9 in the drive force transmission device 100 according to a second embodiment of the present disclosure.

In the following discussion, the components, which are similar to those of the first embodiment, will be indicated by the same reference numerals and will not be described further for the sake of simplicity.

Figure 8A:
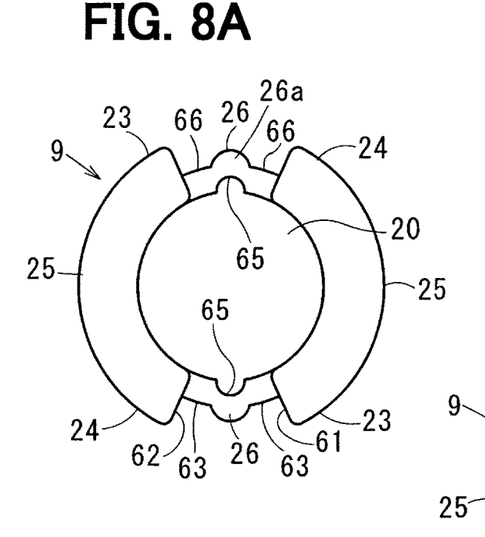
FIGS. 8A to 8D are plan views of various types of shock absorbable rubbers according to a second embodiment of the present disclosure.

As shown in FIG. 8A, in the shock-absorbable rubber 9 of the first example of the present embodiment, a bulged part 26a is formed in a circumferential center part of each of the secondary bridge portions 26, each of which is configured into an arcuate form. The bulged part 26a bulges from a radially inner side of the second bridge portion 26 toward a radially outer side of the second bridge portion 26 at the circumferential center part of the secondary bridge portion 26. A cut part (an arcuate groove) 65, which is a groove having a radial bottom (more specifically, a radially outer bottom), is formed at a radially inner side of the bulged part 26a by cutting into the radially inner side of the bulged part 26a from the radially inner side toward the radially outer side of the second bridge portion 26. Furthermore, two cut parts 66 are formed on two opposite circumferential sides, respectively, of the bulged part 26a in the radially outer side of the secondary bridge portion 26 such that each of the two cut parts 66, which is a groove having a radial bottom (more specifically, a radially inner bottom), is formed by cutting into the radially outer side of the secondary bridge portion 26 from the radially outer side toward the radially inner side of the secondary bridge portion 26.

Figure 8B:
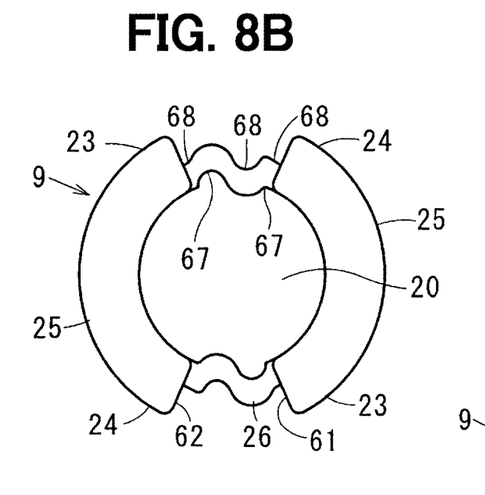

The shock-absorbable rubber 9 of the second example of the second embodiment shown in FIG. 8B is formed such that each of the two secondary bridge portions 26 is configured into a partially arcuate waveform (or a pulsed (rectangular) waveform). Furthermore, in the shock-absorbable rubber 9 of FIG. 8B, each of the two secondary bridge portions 26 includes two cut parts 67 and two cut parts 68. Each of the two cut parts 67 is a groove having a radial bottom (more specifically, a radially outer bottom) and is formed by cutting into the radially inner side of the secondary bridge portion 26 from the radially inner side toward the radially outer side of the secondary bridge portion 26. Each of the two cut parts 68 is a groove having a radial bottom (more specifically, a radially inner bottom) and is formed by cutting into the radially outer side of the secondary bridge portion 26 from the radially outer side toward the radially inner side of the secondary bridge portion 26.

Figure 8C:
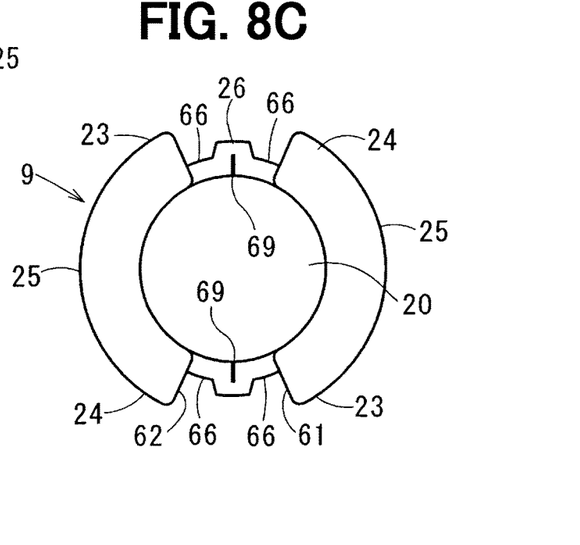

The shock-absorbable rubber 9 of the third example of the second embodiment shown in FIG. 8C is formed such that each of the secondary bridge portions 26 includes a cut part 69, which is a slit and is formed at a radially inner side of a circumferential center part of the secondary bridge portion 26 by cutting into the radially inner side of the circumferential center part of the secondary bridge portion 26 from the radially inner side toward the radially outer side of the second bridge portion 26.

Figure 8D:
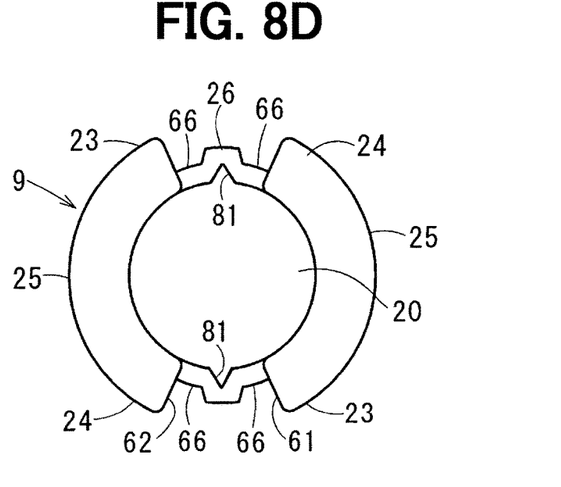

The shock-absorbable rubber 9 of the fourth example of the second embodiment shown in FIG. 8D is formed such that each of the secondary bridge portions 26 includes a cut part 81, which is a V-shape groove and is formed at a radially inner side of a circumferential center part of the secondary bridge portion 26 by cutting into the radially inner side of the circumferential center part of the secondary bridge portion 26 from the radially inner side toward the radially outer side of the second bridge portion 26.

As shown in FIGS. 8A to 8D, a connection between the secondary bridge portion 26 and the primary damper portion 23 and a connection between the secondary bridge portion 26 and the secondary damper portion 24 are placed at the radially inner side of the secondary bridge portion 26, i.e., at the radially inner side of the shock-absorbable rubber 9. In the shock-absorbable rubber 9 of FIGS. 8A to 8D, a radial width of each of the two secondary bridge portions 26 is generally constant along the entire circumferential extent of the secondary bridge portion 26, and each of the two secondary bridge portions 26 has at least three tensile elongation enabling parts, which are placed such that corresponding two of the at least three tensile elongation enabling parts are located at two opposite circumferential sides, respectively, of each of the cut parts 65-69, 81.

As discussed above, the drive force transmission device 100 of the present embodiment can provide advantages, which are similar to those of the first embodiment. Furthermore, the structure of the molding die arrangement, which is used to mold the shock-absorbable rubber 9, can be simplified, and the moldability of the shock-absorbable rubber 9 can be improved. Thus, the costs can be reduced or minimized.

The configuration (e.g., the staggered formation of the cut parts) of each of the secondary bridge portions 26 and the number of the cut parts are not limited to any of the above described ones and may be changed to any desirable ones as long as the shock absorbing function of the shock-absorbable rubber 9 described in the first embodiment can be satisfied. Furthermore, the configuration of each of the cut parts may be any other type of a slit, a groove having a radial bottom, a V-shape groove, a polygonal groove, or an arcuate groove (or a partially arcuate groove).

Third Embodiment

FIGS. 9A to 9D indicate a shock-absorbable rubber 9 of a drive force transmission device 100 according to a third embodiment of the present disclosure.

In the following discussion, the components, which are similar to those of the first and second embodiments, will be indicated by the same reference numerals and will not be described further for the sake of simplicity.

Figure 9A:
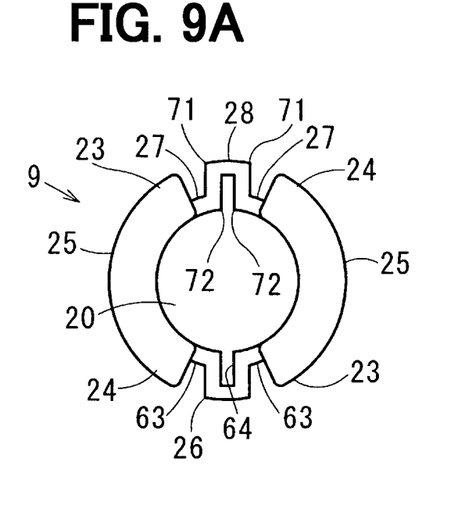
FIG. 9A is a top view of a shock-absorbable rubber according to a third embodiment of the present disclosure.
Figure 9B:
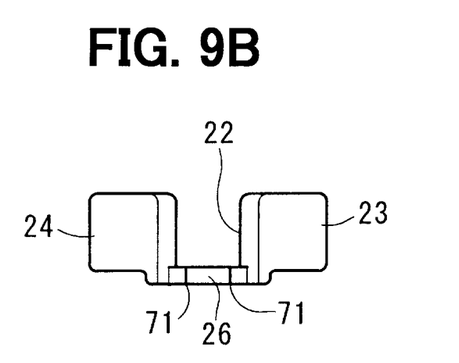
FIG. 9B is a side view of the shock-absorbable rubber of FIG. 9A.
Figure 9C:
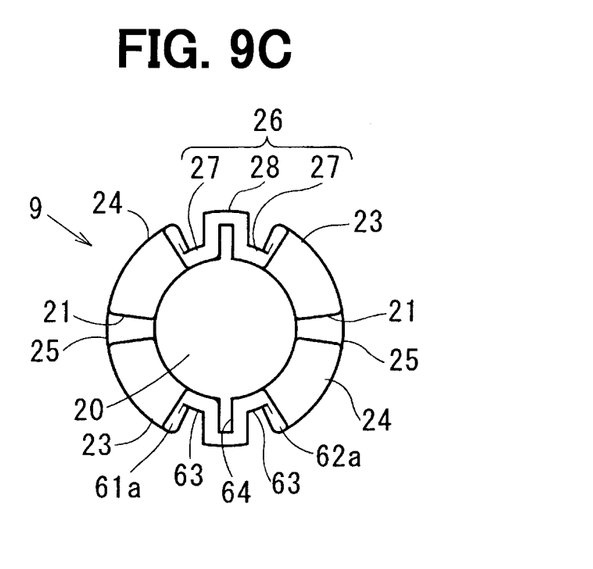
FIG. 9C is a bottom view of the shock-absorbable rubber of FIGS. 9A and 9B.
Figure 9D:
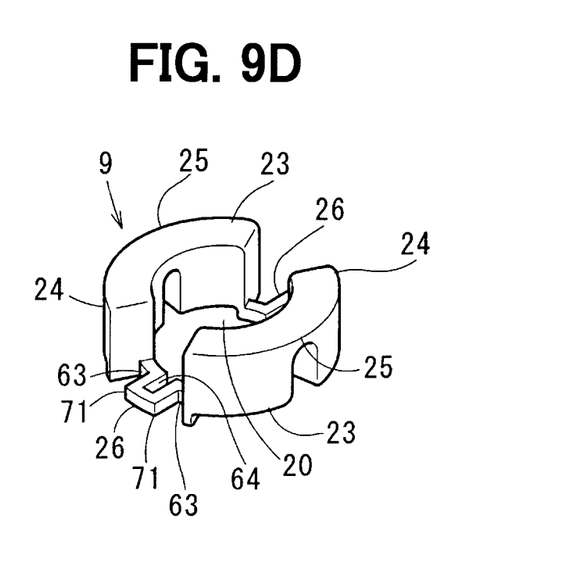
FIG. 9D is a perspective view of the shock-absorbable rubber of FIGS. 9A to 9C.

In the shock-absorbable rubber 9 of the present embodiment, each of the two secondary bridge portions 26 includes a corner 71, 72, which has a right angle and is provided in at least two locations in the secondary bridge portion 26 or a corner (not shown), which is arcuately chamfered or tapered and is provided in at least two locations in the secondary bridge portion 26. In FIGS. 9A to 9C, two corners 71, each of which has the right angle, are formed at two circumferential ends, respectively, of the tensile elongation enabling part 28 at the radially outer side of each secondary bridge portion 26. Furthermore, in FIGS. 9A to 9C, two corners 72, each of which has the right angle, are formed on two circumferential sides, respectively, of the cut part 64 at the radially inner side of each secondary bridge portion 26. In this instance, the cut parts 63, 64 are polygonal grooves having three straight sides. The cut parts 63, 64 may be any other type of polygonal groove(s) having three or more straight sides.

The drive force transmission device 100 of the present embodiment can provide advantages, which are similar to those of the first embodiment and the second embodiment. Furthermore, the structure of the molding die arrangement, which is used to mold the shock-absorbable rubber 9, can be simplified, and the moldability of the shock-absorbable rubber 9 can be improved. Thus, the costs can be reduced or minimized.

Both of the corner(s) 71, 72, which has the right angle, and the corner(s), which is arcuately chamfered, may be formed in the secondary bridge portion 26, if desired.

Now, modifications of the above embodiments will be described.

In the above embodiments, the drive force transmission device of the present disclosure is implemented as the drive force transmission device installed in the electric actuator that rotates the valve shaft 4 of the tumble control valve device used in the intake system of the internal combustion engine. Alternatively, the drive force transmission device of the present disclosure may be implemented as a drive force transmission device, which is installed to an electric actuator that rotates a shaft of a variable intake air control valve device used in a variable intake system, which improves an engine output torque by changing a flow passage length from a valve hole to an intake port of each cylinder of the internal combustion engine or a flow passage cross-sectional area according to an operational state of the internal combustion engine to use an intake air pressure pulsation effect and an inertia charging effect that take place in the intake passage of the internal combustion engine.

Furthermore, the drive force transmission device of the present disclosure may be implemented as a drive force transmission device installed in an electric actuator that rotates a shaft of an intake air flow quantity control valve used in an electronic throttle (intake system), which adjusts the flow quantity of the intake air supplied to a combustion chamber of the internal combustion engine.

Furthermore, the structure of the driven-side rotatable body 8 may be implemented in a driving-side rotatable body that has a gear tooth forming portion that is meshed with a motor side gear, which is rotated by the drive force of the motor M.

Furthermore, the structure of the driving-side rotatable body 7 may be implemented in a driven-side rotatable body that is connected to and is rotatable integrally with a shaft of a driving subject.

Furthermore, both of the driving-side rotatable body and the driven-side rotatable body may be formed as gears. Alternately, both of the driving-side rotatable body and the driven-side rotatable body may be other than gears.

The shaft, which serves as the drive subject, may be a shaft of a rotatable body (a rotator), such as a compressor, a blower, pump, a cam, a rotor, or a vehicle wheel besides the shaft of the valve device, such as the tumble valve device. Furthermore, in place of the shaft, which serves as the drive subject, a shaft or a rod of a linearly movable body, such as a piston or a valve, may be used.

Furthermore, the number of the driving-side projections 11 may be set to be one or may be set to be three or more. Similarly, the number of the driven-side projections 12 may be set to be one or may be set to be three or more. Also, the number of the primary damper portions 23 of the shock-absorbable rubber 9 may be set to be one or may be set to be three or more. Additionally, the number of the secondary damper portions 24 of the shock-absorbable rubber 9 may be set to be one or may be set to be three or more. The number of the primary bridge portions 25 and the number of the secondary bridge portions 26 may be decreased or increased in conformity with the number of the primary damper portions 23 and the number of the secondary damper portions 24 in the shock-absorbable rubber 9.

The shock-absorbable body may be formed by another resilient body (e.g., a spring), which is other than the rubbery elastic material.

Furthermore, the above embodiments and modifications thereof may be combined freely within a principle of the present disclosure. For example, any one or more of the features of any one of the above embodiments may be implemented in another one of the above embodiments.

What is claimed is:

1. A drive force transmission device comprising:
 a driving-side rotatable body;
 a driven-side rotatable body that is driven and is rotated by a drive force transmitted from the driving-side rotatable body; and
 a shock-absorbable body that is placed between the driving-side rotatable body and the driven-side rotatable body, wherein the shock-absorbable body absorbs a torque fluctuation or a shock exerted between the driving-side rotatable body and the driven-side rotatable body, wherein:

the driving-side rotatable body and the driven-side rotatable body include a driving-side projection and a driven-side projection, respectively, and the driving-side projection and the driven-side projection are alternately arranged one after another in a circumferential direction of the shock-absorbable body;

the shock-absorbable body is in a form of a ring and includes:
- a holding recess, into which one of the driving-side projection and the driven-side projection is inserted, wherein an opening of the holding recess opens in an axial end surface of the shock-absorbable body in an axial direction of the shock-absorbable body and extends from the opening toward a deep side of the holding recess in the axial direction;
- a primary damper portion and a secondary damper portion, which are placed on two opposite circumferential sides, respectively, of the holding recess;
- a bridge portion, which is placed at the deep side of the holding recess and connects between the primary damper portion and the secondary damper portion; and
- at least one cut part, which penetrates through the bridge portion in the axial direction of the shock-absorbable body and extends in a radial direction of the shock-absorbable body.

2. The drive force transmission device according to claim 1, wherein:
the at least one cut part includes a plurality of cut parts;
one circumferential end part of the bridge portion is joined to a corresponding circumferential end surface of the primary damper portion, and another circumferential end part of the bridge portion is joined to a corresponding circumferential end surface of the secondary damper portion; and one of the plurality of cut parts is formed by cutting into the one circumferential end part of the bridge portion in the radial direction of the shock-absorbable body along an extension of the corresponding circumferential end surface of the primary damper portion, and another one of the plurality of cut parts is formed by cutting into the another circumferential end part of the bridge portion in the radial direction of the shock-absorbable body along an extension of the corresponding circumferential end surface of the secondary damper portion.

3. The drive force transmission device according to claim 1, wherein a connection between the bridge portion and the primary damper portion and a connection between the bridge portion and the secondary damper portion are placed at a radially inner side of the shock-absorbable body.

4. The drive force transmission device according to claim 1, wherein the bridge portion includes a tensile elongation enabling part that is placed in at least one circumferential side of the at least one cut part.

5. The drive force transmission device according to claim 1, wherein the at least one cut part of the bridge portion includes at least two cut parts.

6. The drive force transmission device according to claim 1, wherein the at least one cut part is a slit, a groove having a radial bottom, a V-shape groove, a polygonal groove, or an arcuate groove.

* * * * *